United States Patent
Brewer et al.

(10) Patent No.: US 8,808,857 B1
(45) Date of Patent: Aug. 19, 2014

(54) CARBON NANOTUBE ARRAY INTERFACE MATERIAL AND METHODS

(75) Inventors: Peter D. Brewer, Westlake Village, CA (US); Andrew T. Hunter, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 837 days.

(21) Appl. No.: 12/185,020

(22) Filed: Aug. 1, 2008

(51) Int. Cl.
*B32B 9/00* (2006.01)

(52) U.S. Cl.
USPC .......................... 428/408; 977/742; 423/448

(58) Field of Classification Search
CPC .................................................. C01B 2202/00
USPC ............. 428/408; 423/447.1, 447.3; 977/742; 165/185
See application file for complete search history.

(56) References Cited

U.S. PATENT DOCUMENTS

| | | | |
|---|---|---|---|
| 6,077,365 A * | 6/2000 | Kawamura et al. | 148/432 |
| 6,407,922 B1 | 6/2002 | Eckblad et al. | |
| 7,086,451 B2 | 8/2006 | Leu et al. | |
| 7,118,941 B2 | 10/2006 | Zhang et al. | |
| 2001/0023986 A1 * | 9/2001 | Mancevski | 257/741 |
| 2004/0166235 A1 * | 8/2004 | Fujii et al. | 427/77 |
| 2004/0261987 A1 * | 12/2004 | Zhang et al. | 165/183 |
| 2008/0014443 A1 * | 1/2008 | Zakhidov et al. | 428/408 |
| 2008/0292840 A1 * | 11/2008 | Majumdar et al. | 428/114 |

OTHER PUBLICATIONS

Savas Berber et al., Unusually High Thermal Conductivity of Carbon Nanotubes, Physical Review Letters, May 15, 2000, vol. 84, No. 20, The American Physical Society, pp. 4613-4616.

* cited by examiner

*Primary Examiner* — Daniel H Miller
(74) *Attorney, Agent, or Firm* — Christie, Parker & Hale, LLP

(57) ABSTRACT

An interface material employing carbon nanotube (CNT) array and a method of fabricating the same. A first CNT array is provided on a first substrate. A second CNT array is provided on a second substrate. A first support layer is disposed on the first CNT array, wherein the first CNT array is between the first support layer and the first substrate. A second support layer is disposed on the second CNT array, wherein the second CNT array is between the second support layer and the second substrate. The first support layer is attached to the second support layer. The first and second substrates are removed, thereby providing the interface material.

6 Claims, 5 Drawing Sheets

CARBON NANOTUBE ARRAY INTERFACE MATERIAL AND METHODS

CROSS-REFERENCE TO RELATED APPLICATION(S)

The present invention is related to copending and commonly-assigned application Ser. No. 12/185,000, titled "POLYMER-INFUSED CARBON NANOTUBE ARRAY AND METHOD," filed on same date herewith. The entire content of which is hereby incorporated by reference.

BACKGROUND OF THE INVENTION

This invention relates to fabrication of interface material and structures employing carbon nanotube (CNT) array.

Carbon nanotube is a nano-scale structure of cylindrical carbon molecules. A CNT array is an array of CNTs, and the CNTs may be aligned in a direction.

CNTs have been produced and observed under a variety of conditions. CNTs have many potential applications such as thermal interface material, electromagnetic, chemical, mechanical and electrical. Techniques have been developed to produce nanotubes in sizeable quantities, including arc discharge, laser ablation, high pressure carbon monoxide (HiPCO), and chemical vapor deposition (CVD). CNTs' electrical conductance is related to their structure and are chemically stable. CNTs typically have very small diameters and large aspect ratios (length/diameter). Due to these and other properties, it has been suggested that CNTs will play an important role in fields such as nano-scale integrated circuits, field emission, and single electronic components. Of particular interest are CNTs with all the nanotubes aligned in the same direction. While such a material presents handling difficulties, it has the promise to be a superior thermal conductor.

In thermal management applications, a conventional thermal interface material is obtained by diffusing particles with a high heat conduction coefficient in a base material. The particles can be graphite, boron nitride, silicon oxide, alumina, silver, or other metals. However, the heat conduction coefficient of conventional thermal interface material is considered to be too low for many contemporary applications, because it cannot adequately meet the heat dissipation requirements of modem electronic components.

Physically, the length of a CNT can be several thousand times its diameter, and the tensile strength of CNTs can be one hundred times that of steel. However, the weight of CNTs is only one sixth of that of steel. Furthermore, CNTs have good flexibility and excellent heat conduction coefficients. Thus, CNTs have excellent characteristics for thermal conduction applications.

For example, CNTs arranged with the nanotubes parallel to the direction of heat flow offer a marked improvement in thermal management. An article entitled *Unusually High Thermal Conductivity of Carbon Nanotubes* and authored by Savas Berber (page 4613, Vol. 84, Physical Review Letters 2000) discloses that a heat conduction coefficient of a CNT can be 6600 W/mK (watts/milliKelvin) at room temperature.

U.S. Pat. No. 6,407,922 discloses a thermal interface material employing CNTs. The thermal interface material is formed by injection molding and has a plurality of CNTs incorporated in a matrix material. A first surface of the thermal interface material engages with an electronic device, and an opposite second surface of the thermal interface material engages with a heat sink. The second surface has a larger area than the first surface, so that heat can be uniformly spread over the larger second surface. However, the thermal interface material is relatively thick and has reduced flexibility. In addition, the CNTs are disposed in the matrix material randomly and multi-directionally. This means that heat does not necessarily spread uniformly through the thermal interface material. Furthermore, heat does not necessarily spread directly from the first surface engaged with the electronic device to the second surface engaged with the heat sink.

U.S. Pat. No. 7,086,451 discloses a heat sink employing CNTs. A layer of CNTs is grown directly on a prepared surface of the heat sink base by catalytic vapor deposition. During the deposition process, the substrate is heated to approximately 700° C. This high temperature can be destructive to some materials and hence limits the choice of material for the heat sink base.

To take full advantage of the properties of CNTs, a capability is desired to use CNTs with aligned tubes and interface the CNTs to a heat sink without having to heat the heat sink to high temperatures. As such, there is a need to develop improved methods to manufacture interface material and structures employing CNTs.

SUMMARY OF THE INVENTION

Embodiments of the present invention provide an interface material employing CNT arrays and a method of fabricating the same. The resulting interface material has the CNT arrays aligned substantially perpendicular to the interface material's interface surfaces. According to the exemplary embodiments of the present invention, the interface material can be made by growing a CNT array on a substrate, disposing a support layer on the CNT array, and removing the substrate. Two CNT arrays on their respective support layers can be attached to each other with a suitable wafer bonding technique to form a stack of CNT arrays. Furthermore, a heat dissipator (e.g., a heat sink) can be attached to the support layer.

In accordance with one embodiment of the present invention, a method of fabricating a material employing CNT arrays is provided. A first CNT array is provided on a first substrate. A second CNT array is provided on a second substrate. A first support layer is disposed on the first CNT array. A second support layer is disposed on the second CNT array. The first support layer is attached to the second support layer. The first substrate and the second substrate are removed. The first and second support layers may be disposed by evaporation, electroplating, or sputtering. The first and second support layers each may include a metal layer (e.g., a copper layer or an aluminum layer). The first support layer may be attached to the second support layer by utilizing a wafer-bonding. The wafer-bonding may be a low temperature copper diffusion bonding. The first support layer may be attached to the second support layer by utilizing an eutectic bonding or a soldering.

This embodiment solves several problems with previous methods of using CNT arrays. First the support layer provides for easier handling of the CNT arrays. Second, by growing the CNT arrays on substrates and then removing the substrates allows the user to attach the CNT arrays to a heat sink or heat generator without having to heat the substrate. In some embodiments, the CNT array can withstand a pressure greater than 20 psi without substantial deformation of the array.

In another embodiment of the present invention, a method of fabricating a thermal dissipation device employing CNT array with a conformal surface is provided. A CNT array is provided on a growth substrate. A support layer is disposed on the CNT array. A thermal dissipator is attached to the support layer. The growth substrate is removed. The support layer may be disposed by utilizing one of evaporation, electroplating, or sputtering. The support layer may include a metal layer (e.g., a copper layer or an aluminum layer).

In a further embodiment of the present invention, a CNT array composite interface material is provided. It includes a first CNT array, a second CNT array, and a support layer with a first side and a second side. The first CNT array is on the first side of the support layer, and the second CNT array is on the second side of the support layer. The support layer may include a first capping layer and a second capping layer. The first capping layer and the second capping layer may bond to each other to form the support layer. The support layer may include a metal layer (e.g., a copper layer or an aluminum layer).

In yet another embodiment of the present invention, a thermal interface device with a conformal surface to transfer heat away from a heat source is provided. The thermal interface device includes a first support layer having a first side and a second side, a first CNT array on the first side of the first support layer, and a thermal dissipator on the second side of the first support layer. The first support layer may include a metal layer (e.g., a copper layer or an aluminum layer). The first CNT array may include a conformal surface for mating with a surface of a heat source. The thermal dissipator may be a heat sink. The thermal interface device may further include a second support layer and a second CNT array, and the second support layer may be between the first CNT array and the second CNT array.

DETAILED DESCRIPTION OF EXEMPLARY EMBODIMENTS

In one embodiment, a method is disclosed for fabricating interface material including CNT arrays. Another embodiment discloses a method for applying CNT arrays to a host substrate by a transfer process that allows CNT array be attached to other material. The embodiments utilizes prefabricated CNT arrays, thereby the embodiments circumvents temperature compatibility issues associated with high growth temperature (e.g., 650° C.-750° C.) of CNT material. The embodiments also facilitate wafer scale processing of the CNT arrays, thereby providing a route to lowering the cost of manufacturing CNT interface material (e.g., gasket). As opposed to conventional methods that disrupt the flatness of the surface of the CNT arrays, the surfaces of the interface material produced by the embodiments herein are extremely flat. This allows good physical contact between the CNT arrays and the mating surface to be achieved at lower contact pressures. The flatness of the CNT array surface also can benefit stealth applications by avoiding stray reflections.

Embodiments of the present invention may be used in applications in the areas of thermal interface materials (e.g., heat transfer elements for electronics), stealth coatings, low observable antenna coatings, chemical and biological sensors (e.g., chemically modified CNTs as channels or electrical devices), reversible adhesives (e.g., artificial gecko feet) and electrical interconnects (e.g., high electrical conductivity).

FIGS. 1-4 illustrate an exemplary CNT array interface material fabricated in accordance with an embodiment of the present invention.

Figure 1:
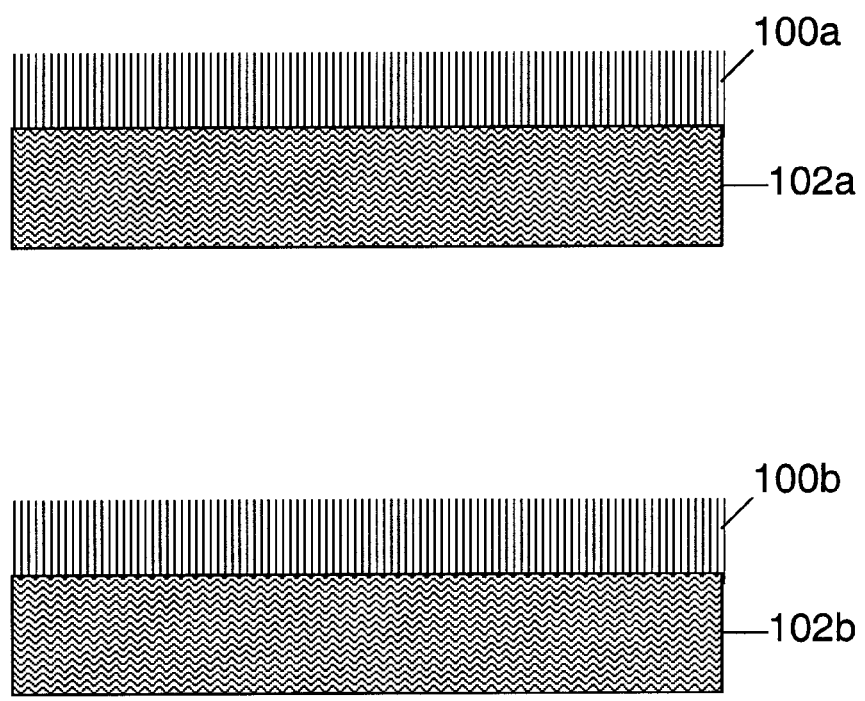
FIG. 1 is a schematic side elevation view of two CNT arrays on two respective substrates.

FIG. 1 shows two CNT arrays on two respective substrates.

In FIG. 1, two CNT arrays 100a, 100b are grown on two respective growth substrates 102a, 102b by conventional methods known to a person skilled in the pertinent art. Material that can be used as the substrate 102a, 102b includes, but not limited to, silicon, quartz, glass, and alumina. As an example, the CNT arrays 100a, 100b can be fabricated on silicon substrates by first depositing a layer of catalyst (not shown) on the silicon substrate, annealing the treated substrate in air at a suitable temperature, and introducing a carbon source gas to the annealed substrate. However, other methods of fabricating CNT array can be used.

Figure 2:
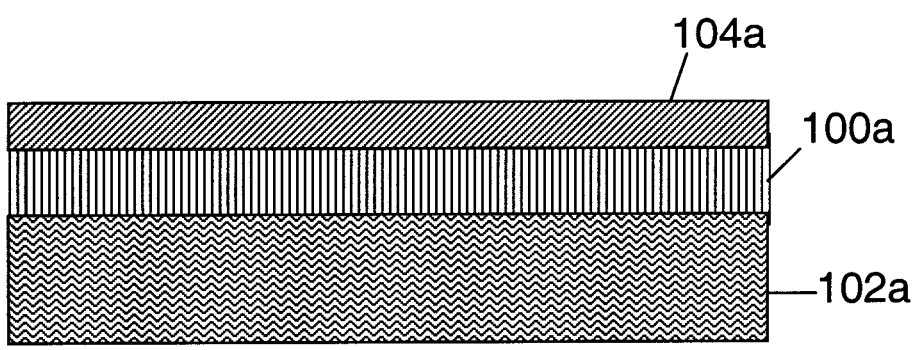
FIG. 2 is a schematic side elevation view showing support layers on the CNT arrays of FIG. 1.
Figure 2:
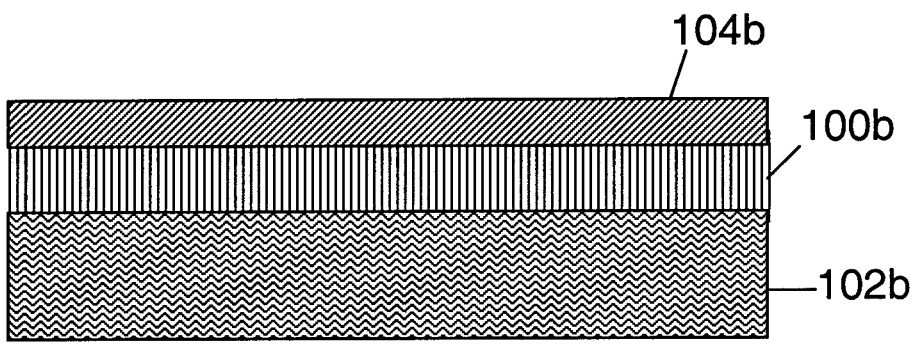

In FIG. 2, support layers 104a, 104b are disposed on the respective CNT arrays 100a, 100b. The support layers 104a, 104b can be metal (e.g., copper, aluminum) disposed on the CNT arrays 100a, 100b. The support layers 104a, 104b can be deposited using one of evaporation, electroplating or sputtering. In selecting the proper material for the support layers 104a, 104b, an important consideration is that the material should quickly solidify once coming into contact with the CNT arrays 100a, 100b. As a result, the material used for the support layers 104a, 104b does not infiltrate the spaces between the CNTs significantly to alter the vertical alignment of the CNTs. Another consideration in choosing the material for the support layer is the thermal conductivity of the material in applications where the resulting interface material will be used to transfer thermal energy (e.g., heat transfer).

Figure 3:
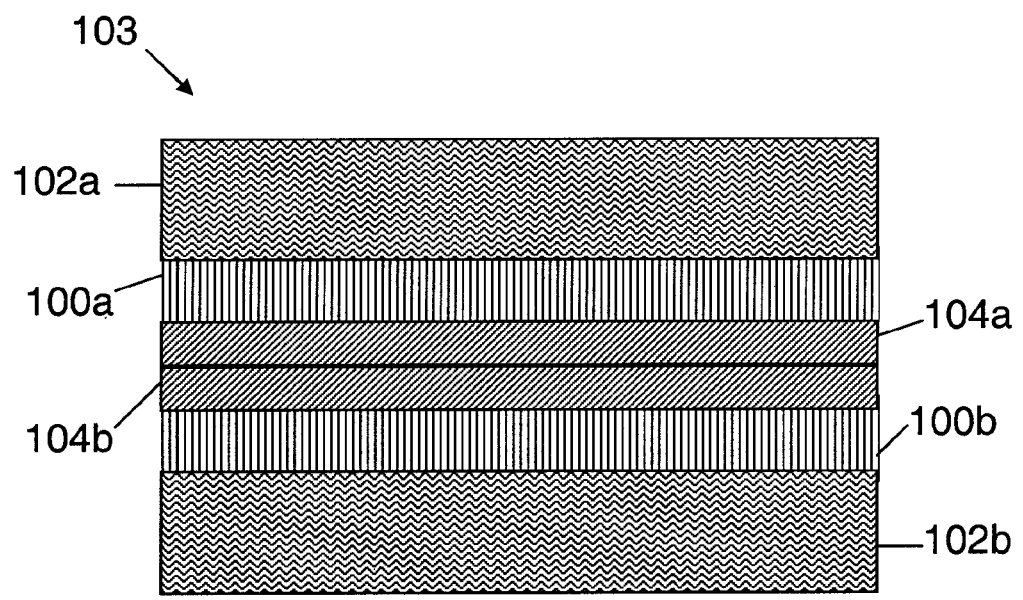
FIG. 3 is a schematic side elevation view showing the support layers of the CNT arrays of FIG. 2 attached to each other.

In FIG. 3, the two support layers 104a, 104b are attached to each other to form a composite structure 103. In one exemplary embodiment of the present invention, the support layers are copper and are joined by wafer bonding method (e.g., copper diffusion bonding) that involves a moderate temperature annealing (e.g., 450° C.) under low pressure (e.g., about 10 psi). Long annealing times are required to allow the copper layers to diffuse into one another. Next, the substrates 102a, 102b are removed from the CNT arrays 100a, 100b.

Figure 4:
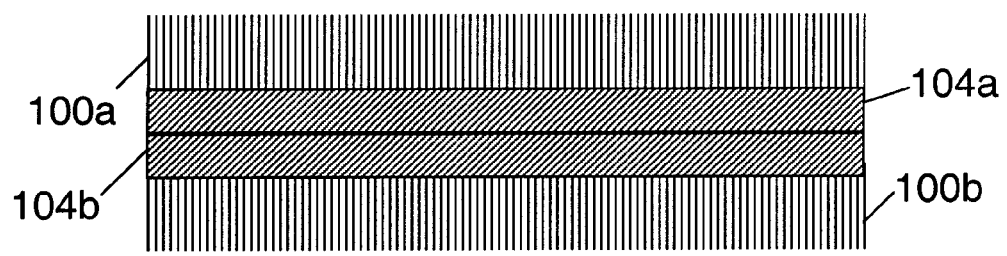
FIG. 4 is a schematic side elevation view of an exemplary CNT interface material in accordance with an embodiment of the present invention.

FIG. 4 shows an exemplary CNT interface material fabricated in accordance with the present invention with the substrates 102a, 102b removed. The method used to remove the substrate 102a, 102b depends on the type of substrate used to grow the CNT array 100a, 100b. In an exemplary embodiment, if the substrates 102a, 102b are silicon substrates, the CNT arrays 100a, 100b can be removed from the substrates 102a, 102b using an respective underlying release layer (not shown) such as SiO2 with a thickness around 1000-5000 Å, the release layers are formed on the respective substrates 102a, 102b prior to the CNT arrays 100a, 100b being fabricated. Then, the composite structure 103 of FIG. 3 can be immersed in a 10% buffered hydrofluoric acid (HF) solution for about one to ten minutes to remove the substrates 102a, 102b.

Figure 5:
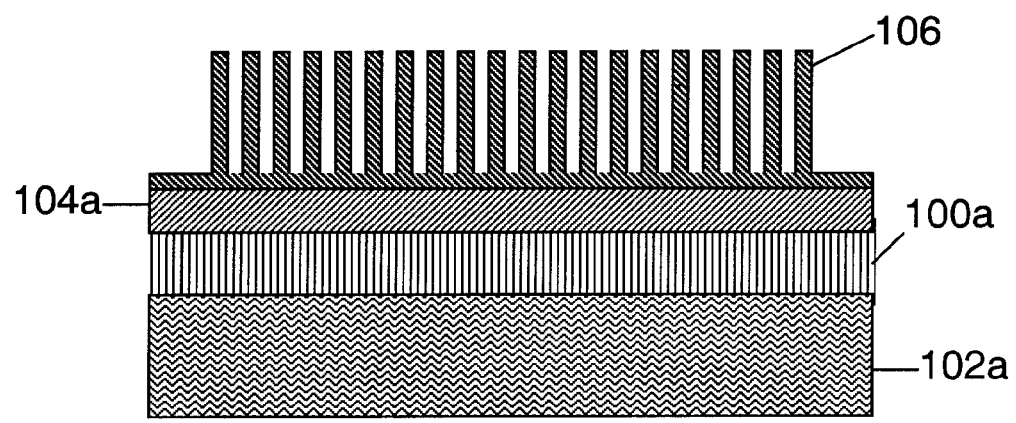
FIG. 5. is a schematic side elevation view showing a thermal dissipator attached to the support layer of the CNT array of FIG. 2.
Figure 6:
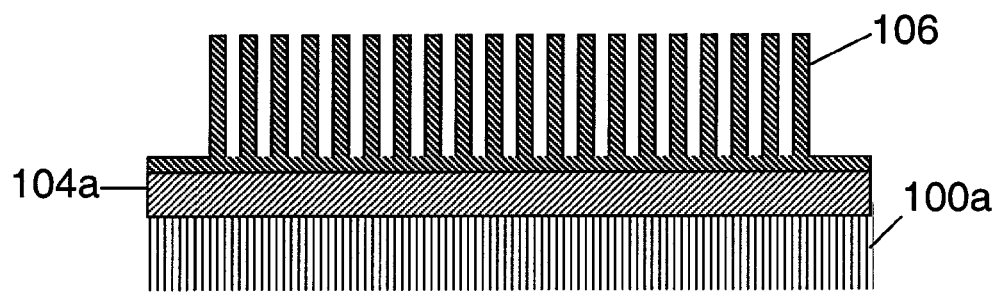
FIG. 6. is a schematic side elevation view of an exemplary embodiment of a thermal interface device in accordance with the present invention.

FIGS. 5-6 illustrate another exemplary embodiment of the present invention.

In FIG. 5, a heat dissipator (e.g., a heat sink) 106 is attached to the support layer 104a of FIG. 2. The heat dissipator 106 is made of a material that has a suitably high thermal conductivity (e.g., copper, aluminum).

FIG. 6 shows a conformal thermal dissipation device according to an exemplary embodiment of the present invention. The growth substrate 102a of FIG. 5 is removed by suitable methods to expose a CNT array surface. This surface is flat and conformal making the surface an excellent thermal interface.

Figure 7:
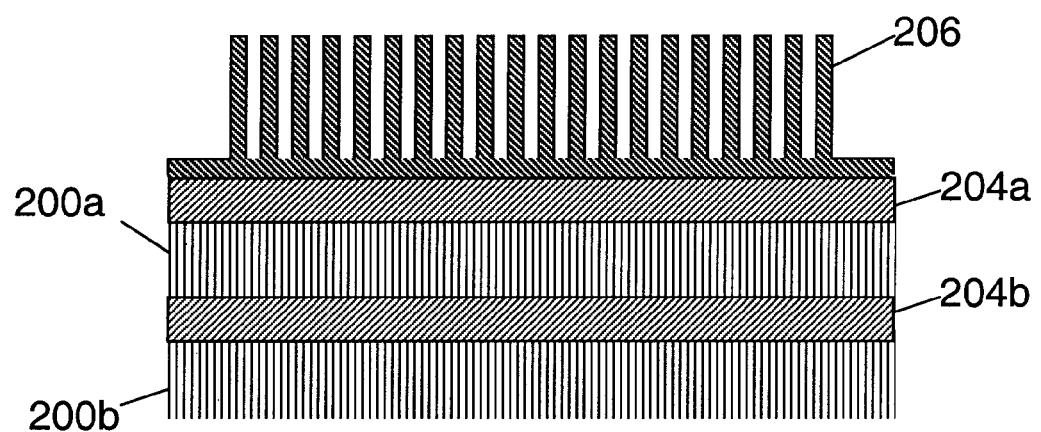
FIG. 7 is a schematic side elevation view of another exemplary embodiment of a thermal interface device in accordance with the present invention.

FIG. 7 shows a device that is further built up from the device shown in FIG. 6 by adding a second layer of support layer and CNT array to create a taller thermal interface device. The device in FIG. 7 includes a heat dissipator (e.g., a heat sink) 206 that is attached to a first support layer (e.g., a metal layer) 204a. A first CNT array 200a is attached between the first support layer 204a and one side of a second support layer (e.g., a metal layer) 204b. A second CNT array 200b is attached to another side of the second support layer 204b.

Although the present invention had been described in considerable detail with reference to certain exemplary embodiments thereof, other versions are possible without exceeding the spirit and scope of the present invention. Therefore, the appended claims should not be limited to the description of the embodiments described herein.

What is claimed is:

1. A method of fabricating a material employing carbon nanotube arrays, the method comprising:
    growing a first carbon nanotube array on a first growth substrate;
    growing a second carbon nanotube array on a second growth substrate;
    disposing a first support layer on a surface of the first carbon nanotube array while the first carbon nanotube array is attached to the first growth substrate;
    disposing a second support layer on a surface of the second carbon nanotube array while the second carbon nanotube array is attached to the second growth substrate;
    attaching the first support layer to the second support layer; and
    removing the first growth substrate and the second growth substrate from the first carbon nanotube array and the second carbon nanotube array, after attaching the first support layer to the second support layer,
    wherein the removing of the first growth substrate comprises forming a substantially flat conformal surface of the first carbon nanotube array by exposing another surface thereof,
    wherein the removing the second growth substrate comprises forming a substantially flat conformal surface of the second carbon nanotube array by exposing another surface thereof, and
    wherein each of the first support layer and the second support layer comprises copper or aluminum throughout.

2. The method of claim 1, wherein the first support layer and the second support layer are disposed by one of evaporation, electroplating, or sputtering.

3. The method of claim 1, wherein said attaching the first support layer to the second support layer is by utilizing a wafer-bonding.

4. The method of claim 3, wherein the wafer-bonding is a low temperature copper diffusion bonding.

5. The method of claim 1, wherein said attaching the first support layer to the second support layer is by utilizing an eutectic bonding.

6. The method of claim 1, wherein said attaching the first support layer to the second support layer is by utilizing a soldering.

* * * * *